United States Patent [19]
Van Rensburg et al.

[11] Patent Number: 5,129,622
[45] Date of Patent: Jul. 14, 1992

[54] SPINDLE OPERATED VALVE

[75] Inventors: Gert N. J. Van Rensburg, Benoni; Linda Horne, Atlasville, both of South Africa

[73] Assignee: Cactas CC, Benoni, South Africa

[21] Appl. No.: 699,278

[22] Filed: May 13, 1991

[30] Foreign Application Priority Data

Nov. 23, 1989 [ZA] South Africa .............. 89/8942

[51] Int. Cl.$^5$ .................. F16K 25/00; F16K 1/14
[52] U.S. Cl. .................. 251/203; 251/231; 251/319; 137/901
[58] Field of Search .......... 251/318, 319, 326, 198, 251/203, 362, 215, 251, 231; 137/901

[56] References Cited
U.S. PATENT DOCUMENTS 1,763,942  6/1930  Baker ........................ 137/901 X
3,602,481  8/1971  Martin et al. ............... 251/362 X
4,887,792  12/1989  Kuo ........................... 251/203 X

*Primary Examiner*—Martin P. Schwadron
*Assistant Examiner*—Kevin L. Lee
*Attorney, Agent, or Firm*—Kilpatrick & Cody

[57] ABSTRACT

The invention provides a valve which comprises a body defining a passageway therethrough, a valve seat in the passage, a valve closure disposed in the passageway adjacent the valve seat, and an operating spindle projecting transversely into the passageway, the arrangement being one wherein movement of the spindle into the passageway causes the closure to be urged against the valve seat to close the valve, and movement of the spindle in a direction out of the passageway permits movement of the closure away from the seat to open the valve, the operating spindle being coupled to the closure by means of an intermediate articulated arm or roller.

5 Claims, 3 Drawing Sheets 005,129,622

SPINDLE OPERATED VALVE

FIELD OF INVENTION

This invention relates to a valve.

1. SUMMARY OF INVENTION

The object of the present invention is to provide a novel valve which will have useful applications and which it is believed will display advantages over conventional valves in particular applications.

2. OBJECT OF THE INVENTION

A valve in accordance with the present invention comprises a body defining a passageway therethrough, a valve seat in the passage, a valve closure disposed in the passageway adjacent the valve seat, and an operating spindle projecting transversly into the passageway, the arrangement being one wherein movement of the spindle into the passageway causes the closure to be urged against the valve seat to close the valve, and movement of the spindle in a direction out of the passageway permits movement of the closure away from the seat to open the valve.

In one arrangement in accordance with the invention the operating spindle will be coupled to the closure by means of an intermediate articulated arm member such that the angle between the operating spindle and the arm increases progressively as the spindle moves into the passageway to close the valve, thereby increasing the mechanical advantage of the spindle and the force which the latter exerts on the closure.

In a preferred arrangement the closure will be in the form of a spherical ball and a guide provided for the ball in the passageway, the guide being adapted to direct the ball towards the seat at an angle relative to the axis of the passageway. With such an arrangement it is envisaged that the operating spindle will be pivotally coupled to linking arms which flank the ball and are in turn coupled to a pin or the like which passes through the ball substantially centrally. It is envisaged that with such an arrangement the ball will perform a rolling action upon movement towards or away from the closure.

The invention also envisages that a guide may be provided for the operating spindle to limit deflection of the spindle during the process of urging the closure onto the valve seat.

In an alternative arrangement the linking arms will be dispensed with and the operating spindle will terminate in an abutment, preferably a roller which is adapted to engage the outer surface of the ball to urge the latter against the valve seat during the closing procedure. With such an arrangement a suitable guide for the abutment or roller will be provided to ensure that contact between the abutment or roller and the ball is in a desired position.

The invention further provides that the valve seat will be disposed towards one end of the passage and held in position by means of a removable flange or the like such that removal of the flange will enable the valve seat to be removed from the valve for maintenance or replacement purposes. Preferably the valve seat will be disposed at the end of the passageway so that its retaining flange need merely be spaced slightly from the valve to permit removal of the seat.

DETAILED DESCRIPTION TO INVENTION

The features of the invention will appear more fully from the preferred embodiment described below purely by way of example with reference to the accompanying drawings wherein.

Figure 1:
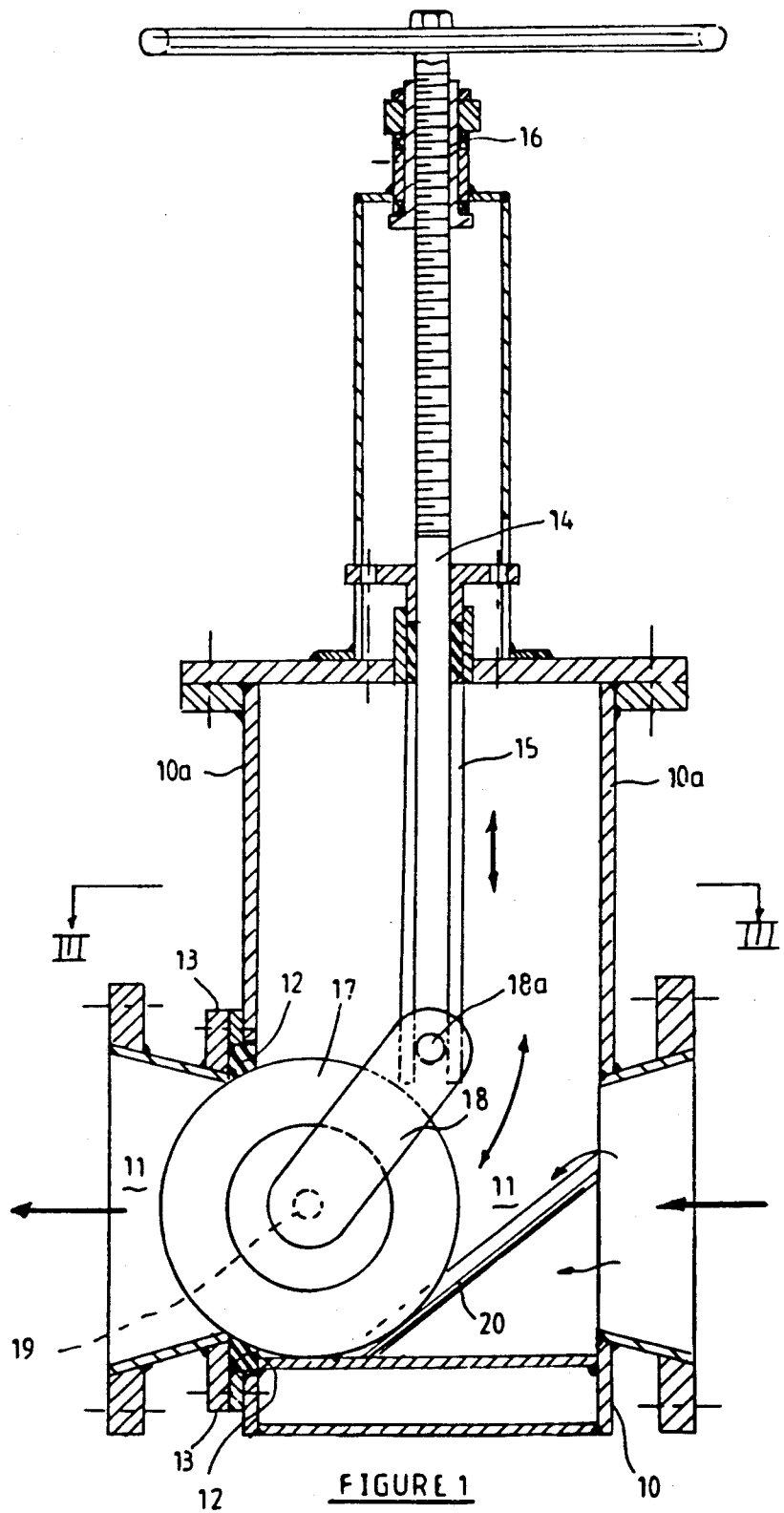
FIG. 1 is a schematic sectioned elevation of a valve in accordance with the invention.

Referring to the drawings a valve of the invention comprises a body 10 defining a passageway 11 therethrough. A valve seat 12 is positioned at one end of the passageway 11 and is held in position by means of a locating flange 13 which is bolted to the body by means of bolts, not shown. The arrangement provides for ready replacement of the seat by simply removing the bolts and extracting the seat 12 transversely from between the body 10 and the locating flange 13. A replacement seat can be fitted by the reverse operation.

The valve further includes an operating spindle 14 which projects transversely towards the passageway 11 and is housed in a branch member 10a of the body 10. Preferably the spindle 14 will project into the passageway 11 substantially at right angles to the axis thereof as illustrated. Alternatively the spindle 14 could meet the passageway at an angle if desirable. The invention envisages that the branch member 10a will define a guideway 15 for the leading end of the operating spindle 14 to locate such leading end positively relative to the body 10. In the arrangement illustrated the spindle 14 is threaded and engages a complementary nut member 16 which is fixed relative to the branch member 10a so that rotation of the spindle 14 will cause axial movement thereof into and out of the passageway 11.

Figure 3:
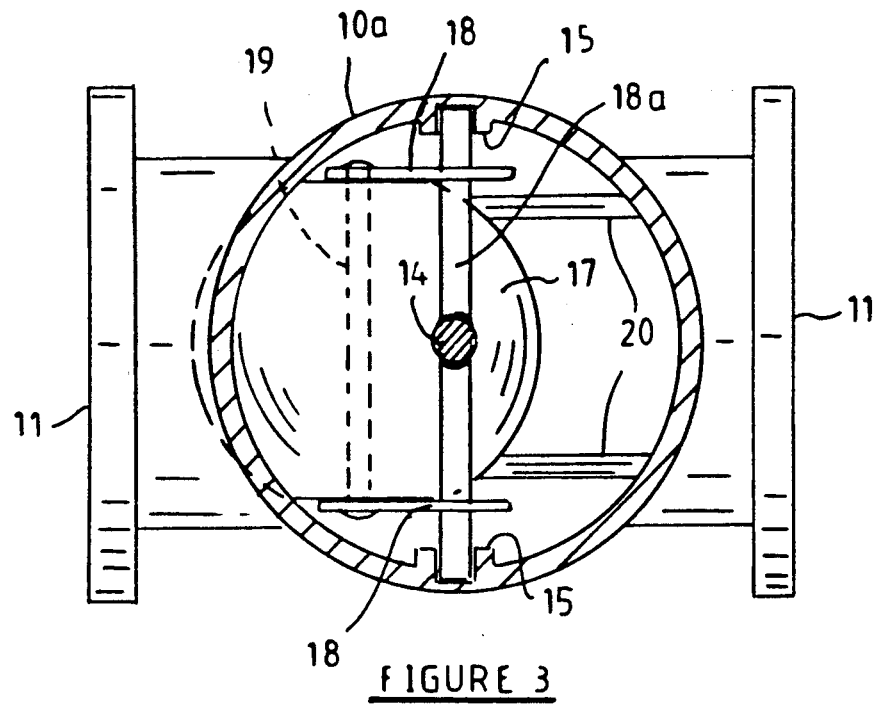
FIG. 3 is a section on line III—III in FIG. 1.

A closure for the valve comprises a ball member 17 which is adapted to fit onto the seat 12 as illustrated in order to close the valve, and to be displaced from the seat 12 to open the valve. In one arrangement in accordance with the invention shown in FIG. 1 and FIG. 3, the ball closure 17 will be coupled to the operating spindle 14 by means of a pair of link arms 18 which are pivotally coupled to the spindle 14 at their one end of 18a. The link arms are designed to flank the ball closure 17 and to be pivotally coupled to the latter by means of a pin element 19 passing through the ball closure 17 substantially centrally. With such an arrangement therefore the ball closure 17 will roll towards the valve seat 12 during the process of closing the valve, and will be withdrawn away from the valve seat 12 during the process of opening the valve.

Preferably a ramp in the form of a pair of spaced rail elements 20 will be provided to guide the ball 17 at an angle from the branch member 10a towards the valve seat 12. With the arrangement shown in FIG. 1 and FIG. 3, the ball 17 will thus move from a position wherein the ball is located substantially below the operating spindle 14 with the link arms 18 substantially in line with the spindle 14, progressively towards the valve seat 12 as the spindle 14 moves towards the passageway 11. As the ball 17 moves progressively towards the valve seat 12, the angle between the operating spindle 14 and the link arms 18 will increase progressively thus increasing the mechanical advantage of the spindle force exerted on the ball 17. It has been found that in this way a substantial closing force can be exerted on the ball 17 as it is urged against the valve seat 12. It will be appreciated that the guide 15 provided in the branch member 10a will ensure that the spindle 14 is not deflected away from the valve seat 12.

Figure 2:
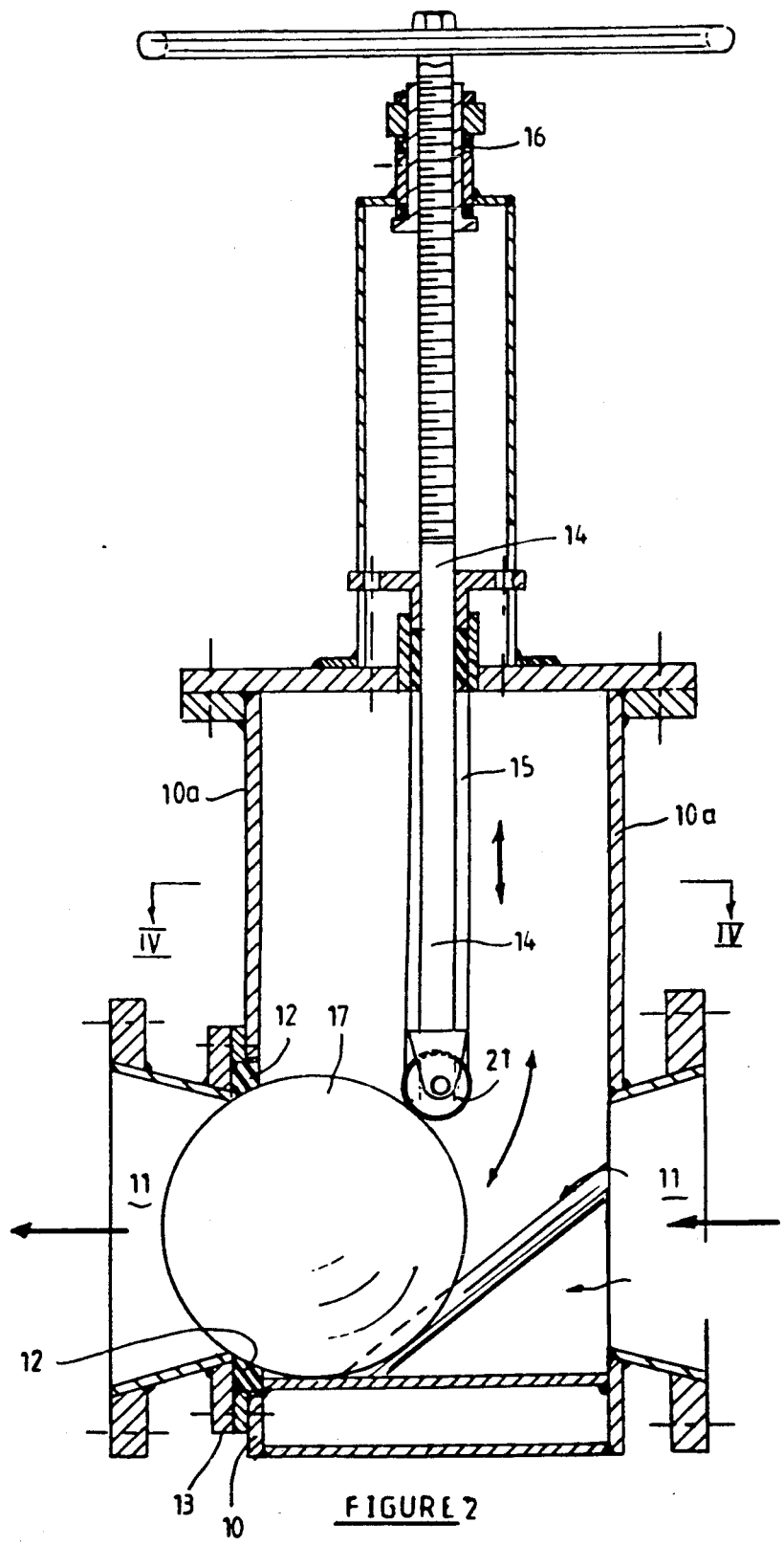
FIG. 2 is a schematic sectioned elevation of a different embodiment of a valve in accordance with the invention.
Figure 4:
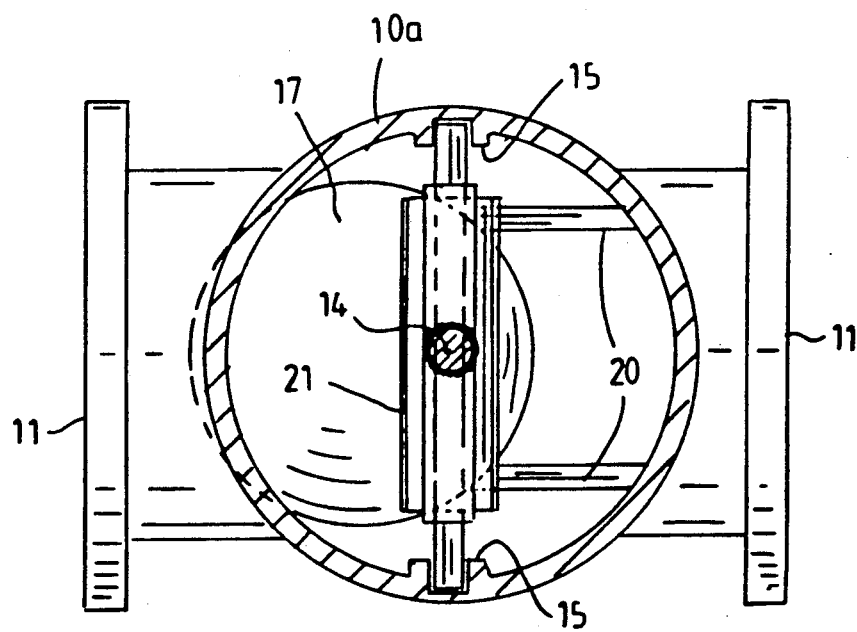
FIG. 4 is a section on line IV—IV in FIG. 2.

The arrangement shown in FIGS. 2 and 4 differs from that described above in that the ball closure 17 is not secured to the operating spindle 14 by means of link members 18. Instead the operating 14 spindle terminates in a roller 21 which is adapted to engage the side of the ball member 17 off the center line thereof, to urge the ball 17 in the direction of the valve seat 12 during the closing process. It will be noted that the roller member 21 is again guided in the guides 15 defined in the branch member 10a. With this arrangement, when the spindle 14 and thus the roller 21 are progressively withdrawn from the passage 11, the ball closure 17 will be capable of moving away from the valve seat 12, but it will be appreciated that the ball closure 17 is not positively withdrawn from the seat 12 by movement of the operating spindle 14. With this arrangement therefore the valve can serve also as a unidirectional, non-return valve. It will also be appreciated that the mechanical advantage exercised by the spindle 14 on the ball closure 17 will again increase as the roller 21 moves towards the center line of the passageway 11.

The advantages of the valve of the invention will be apparent to persons skilled in the art. It will be understood that the valve is relatively easy to construct requiring little machining, will be durable, and particularly suitable for use with abrasive fluids.

Doubtless many variations of the invention exist without departing from the principles set out in the consistory clauses. For example, various materials will be suitable for the valve closure 17 and the seat 12 depending on the application of the valve. Preferably, in order to ensure a fluid tight seal between the seat 12 and the ball closure 17, one or both of these members will be of a relatively resilient material such a polyurethane.

We claim:

1. A valve comprising a body defining a passageway therethrough, a valve seat in the passageway, a valve closure disposed in the passageway adjacent the valve seat, and an operating spindle projecting transversely into the passageway, movement of the spindle into the passageway causing the closure to be urged against the valve seat to close the valve, and movement of the spindle in a direction out of the passageway permitting movement of the closure away from the seat to open the valve, the operating spindle being coupled to the closure by means of an intermediate articulated arm such that the angle between the operating spindle and the arm increases progressively as the spindle moves into the passageway to close the valve, thereby increasing the mechanical advantage of the spindle and the force which said spindle exerts on the closure.

2. The valve according to claim 1 wherein the closure is a spherical ball and a guide is provided for said ball in the passageway; said guide directing said ball towards the seat at an angle relative to the axis of the passageway.

3. The valve according to claim 1 wherein the operating spindle is coupled to a pair of linking arms which constitute the intermediate articulated arm, said linking arms flanking said closure and coupled to diametrically opposed coupling formations on said closure.

4. The valve according to claim 3 wherein the coupling formations project from said closure and are receivable in opposed guide formations.

5. The valve according to claim 3 wherein said closure is a spherical ball which is rotatable about an axis passing through said coupling formations.

* * * * *